UNITED STATES PATENT OFFICE.

ALFONS GAMS AND BERTHOLD SCHREIBER, OF BASEL, SWITZERLAND, ASSIGNORS TO SOCIETY OF CHEMICAL INDUSTRY IN BASLE, OF BASEL, SWITZERLAND.

HIGHLY ACTIVE VITAMIN PREPARATION THOROUGHLY FREED FROM INACTIVE INGREDIENTS.

1,235,198.  Specification of Letters Patent.  Patented July 31, 1917.

No Drawing.   Application filed February 2, 1917.  Serial No. 146,256.

*To all whom it may concern:*

Be it known that we, Dr. ALFONS GAMS, a citizen of the Swiss Republic, and resident of Basel, Switzerland, and Dr. BERTHOLD SCHREIBER, a subject of the King of Hungary, and resident of Basel, Switzerland, have invented new Highly Active Vitamin Preparations Thoroughly Freed From Inactive Ingredients, of which the following is a full, clear, and exact specification.

It is known that most of the food products for human and animal use and other substances of vegetable and animal origin contain more or less of the so-called vitamins which are of importance in the economy of the human and animal life and are very useful to combat the so-called avitaminous complaints as for instance beri-beri, scurvy, polyneuritis, pellagra, rickets and other morbid conditions due to malnutrition. Nobody succeeded heretofore in isolating these bodies in a form convenient for therapeutical purposes and with a technically satisfactory yield.

We have now found that highly active vitamin preparations, which are able to be employed for therapeutical purposes and are freed from inactive ingredients, are obtained by extracting food products or other substances of vegetable or animal origin, as for instance rice-bran, yeast, flesh, beans, etc., with dilute alcohol, separating the resulting aqueous alcoholic extracts from alcohol by distillation in a vacuum and treating the aqueous extracts thus obtained successively in an acid state by lead acetate (sugar of lead) and in a neutral state by basic lead acetate. Hereby the treatment with lead acetate (sugar of lead) in an acid state produces only the precipitation of the most of the inactive ingredients, the active substance remaining in solution. By the subsequent treatment with basic lead acetate in a neutral solution, contrary to the statements in the literature of the subject, only further impurities are precipitated, without appreciable loss of active substances. The lead is separated according to known processes from the solutions freed from the precipitated inactive ingredients and by evaporating the solutions thus obtained in a vacuum, directly a highly active preparation is obtained, which is easily soluble in water to a clear solution and is able to be preserved indefinitely and adapted to be administered *per se*. It constitutes a yellow-brown hygroscopic mass, easily soluble in water to solutions showing with litmus a feeble acid reaction, also easily soluble in absolute methylalcohol and insoluble in absolute ethylalcohol, ether and acetone. By adding alkalin to its aqueous solutions, the coloration of these latter turns to yellow and a strong methylamin smell is developed. By adding diazobenzene sulfonic acid to its solutions in an aqueous solution of sodium carbonate the coloration of the said solutions turns to an intense Bordeaux-red. With tannin, silver nitrate, phosphotungstic acid and phosphor-molybdic acid its aqueous solutions give precipitates; the precipitate obtained with phosphotungstic acid dissolves on addition of a solution of sodium carbonate to a green to blue solution.

The food products or other substances of vegetable and animal origin employed as parent materials can, if desired, be subjected previously to a mechanical, or physical or chemical treatment making their extraction with alcohol more easy, for instance a comminution with quartz sand, a plasmolysis, a hydrolysis with dilute acids or alkalis, a digestion for instance with pepsin and hydrochloric acid, etc.

In order to obtain more concentrated vitamin preparations, which are sufficiently pure for injections, the active substances can be precipitated from the solutions freed from most of the inactive ingredients and from lead by adding to the said solutions the usual alkaloid precipitants as for instance solutions of tannin, phosphotungstic acid or heavy metal salts, whereafter the separated precipitates are decomposed in a liquid medium according to known process and the solutions thus obtained evaporated to dryness in vacuum, after having been freed from metal, if necessary.

The process is illustrated by the following examples:

Example 1: Rice-bran in a broken up and finely divided state is fully extracted, in the cold, with dilute alcohol and the solution obtained is freed from alcohol by evaporating in a vacuum. The aqueous milky liquid is, if desired, separated by decantation from the oil and grease floating on its surface, and hereafter it is acidified with acetic acid and a solution of lead acetate (sugar of lead) is added thereto until no further precipitate is produced. The clear solution, separated by filtering off the lead acetate precipitates, is accurately neutralized and hereafter a neutralized solution of basic lead acetate is added thereto until no further precipitate is produced. The solution separated from the precipitate by filtering is freed from lead by means of hydrogen sulfid or sulfuric acid. In the first case, the solution obtained by filtering is directly evaporated to dryness in a vacuum and in the second case the excess of sulfuric acid is removed by addition of barium hydroxid and the solution showing still a feeble acid reaction with Congo is concentrated in a vacuum. In each case a light-yellow crystalline powder is obtained, which is easily soluble in water to a clear solution and contains most of the vitamin, contained in the parent material in a concentrated, highly active and permanent form.

Example 2: The feebly sulfuric solution thoroughly freed from the inactive ingredients and from the lead, obtained according to Example 1, is concentrated in a vacuum and hereafter a sulfuric solution of mercury oxid is added until no further precipitate is produced. The precipitate is filtered off, washed and treated in an aqueous suspension with hydrogen sulfid. After the liquid has been separated by filtering from mercury sulfid, it is freed from hydrogen sulfid by evaporation in a vacuum or by introducing an excess of carbonic acid and hereafter evaporated to dryness in a vacuum. The remaining residue is a yellow-brown mass, easily soluble in water, which contains the active substances of the parent material (vitamin) in a concentrated and very pure form.

Example 3: The solution freed from inactive ingredients and from lead, obtained according to Example 1, is acidified with oxalic acid and hereafter a solution of phosphotungstic acid is added thereto, until no further precipitate is produced. The precipitate separated by filtering and washed out with water containing oxalic acid is suspended in water and the oxalic acid in excess is precipitated with calcium carbonate. The precipitate is filtered off and the filtrate is accurately freed from calcium hydroxid in excess and evaporated to dryness in a vacuum. There is thus obtained a yellow-brown crystalline powder, easily soluble in water, which contains the vitamin of the parent material employed in a highly concentrated, very pure and permanent form, and is suitable for purposes of injection. As compared with the process described in the U. S. Letters Patent No. 1162908 dated December 7, 1915, according to which a vitamin preparation is prepared by precipitating yeast extract with phosphotungstic acid, treating the obtained precipitate with acetone and decomposing the product insoluble in acetone by means of lead acetate, the present process has the great advantage that it separates the active substances contained in the parent materials in far higher yields.

Instead of the rice-bran indicated in the example, other nutrient substances of foodstuffs, as for instance yeast, flesh, milk, beans, etc., and other substances of vegetable or animal origin can be employed.

What we claim is:

1. The described process for the manufacture of highly active vitamin preparations thoroughly freed from inactive ingredients, consisting in extracting organic food products with dilute alcohol, removing the alcohol from the resulting aqueous alcoholic extracts by distillation in a vacuum and precipitating the inactive ingredients from the remaining aqueous extracts by treating the said extracts successively in an acid state by lead acetate (sugar of lead) and in a neutral state by basic lead acetate, freeing the thus purified extracts from lead and evaporating the same in a vacuum.

2. The described process for the manufacture of highly active vitamin preparations thoroughly freed from inactive ingredients, consisting in extracting organic food products with dilute alcohol, removing the alcohol from the resulting aqueous alcoholic extracts by distillation in a vacuum, precipitating the inactive ingredients from the remaining aqueous extracts by treating the said extracts successively in an acid state by lead acetate (sugar of lead) and in a neutral state by basic lead acetate, freeing the thus purified extracts from lead, treating the same afterward with one of the usual alkaloid precipitants of alkaloids, decomposing in a liquid medium the precipitates thus produced and evaporating the resulting solutions in a vacuum.

3. As new articles of manufacture, the herein described highly active vitamin preparations thoroughly freed from inactive ingredients, constituting yellow-brown hygroscopic substances, which are soluble in water to solutions showing with litmus a feeble acid reaction, becoming yellow and developing a strong methylamin smell on addition of alkalis and forming on addition of tannin, silver nitrate, phosphotungstic acid and phosphomolybdic acid precipitates of which those furnished with phosphotungstic acid dissolve on addition of a solution of sodium carbonate to a green to blue solution, dissolving easily in absolute methyl alcohol and insoluble in absolute ethyl alcohol, ether and acetone, and dissolving in watery solutions of sodium carbonate to solutions becoming intense Bordeaux-red on addition of diazobenzenesulfonic acid.

In witness whereof we have hereunto signed our names this 11th day of January 1917, in the presence of two subscribing witnesses.

Dr. ALFONS GAMS.
Dr. BERTHOLD SCHREIBER.

Witnesses:
CARL O. SPANIER,
AMAND RITTEY.